Jan. 7, 1969　　　　P. G. IVERSEN　　　　3,420,358
RECIPROCATING TYPE CONVEYOR
Filed Feb. 14, 1967
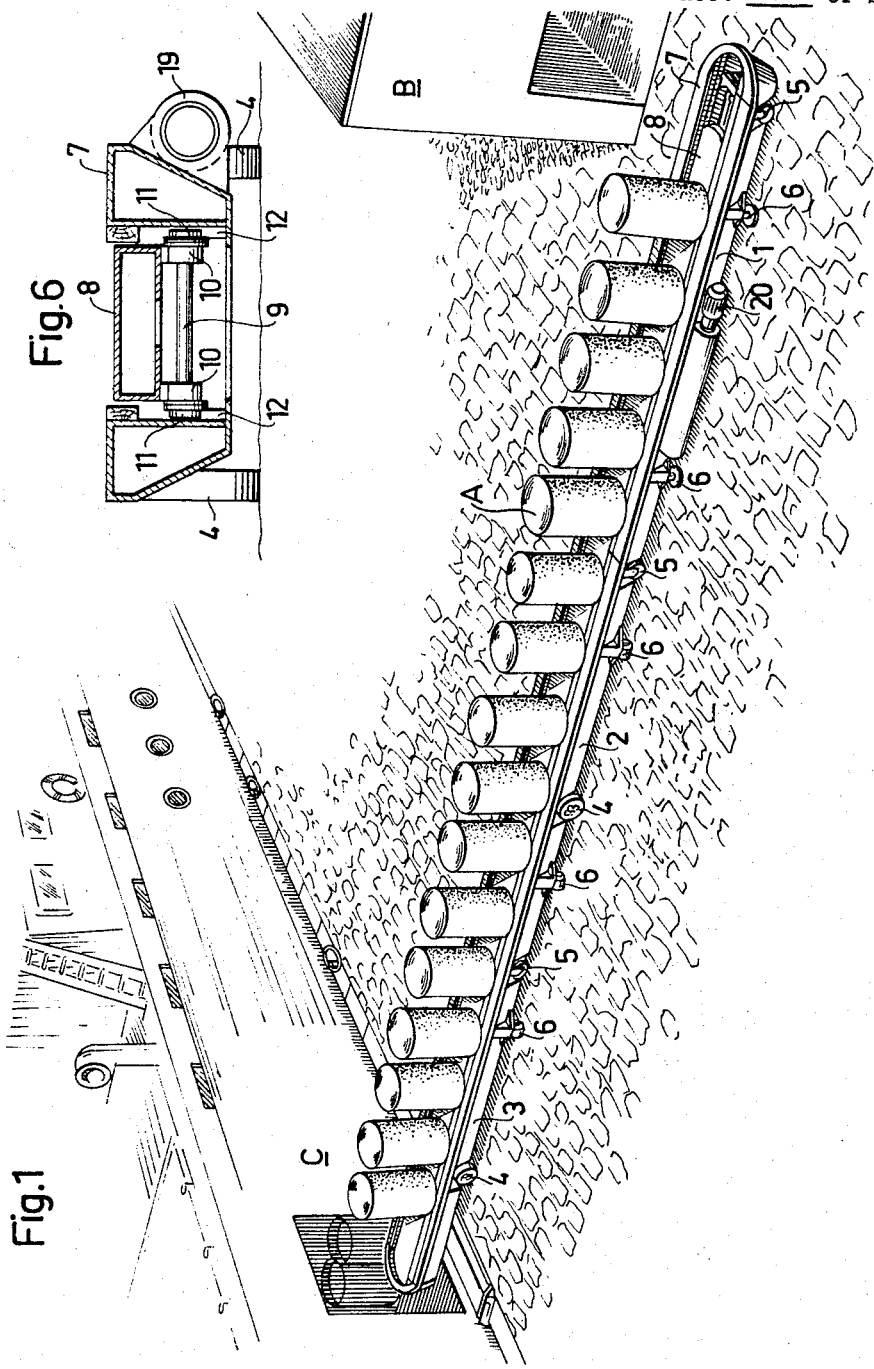

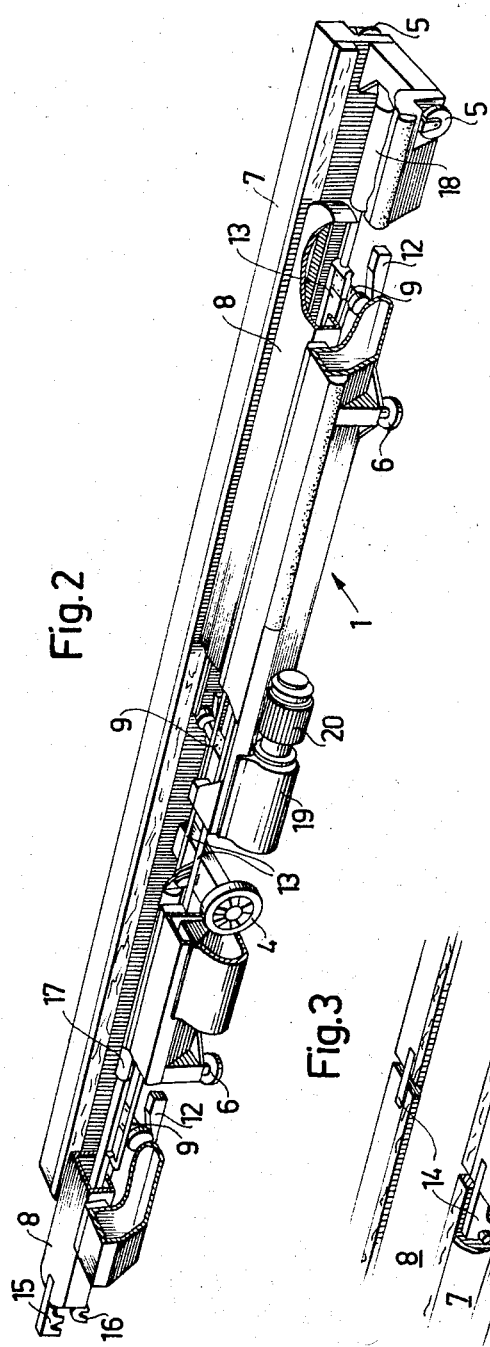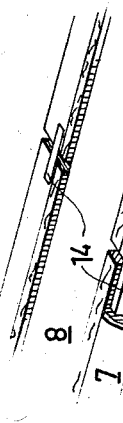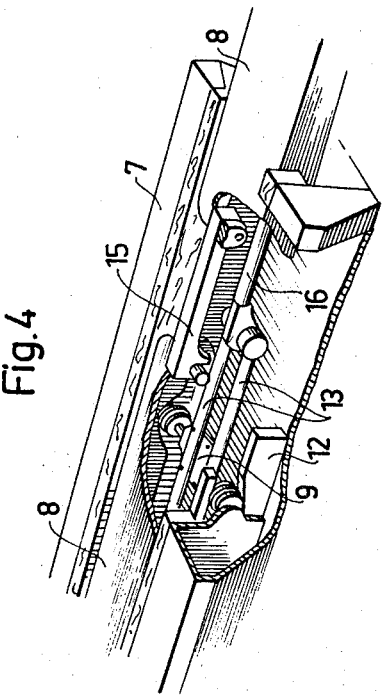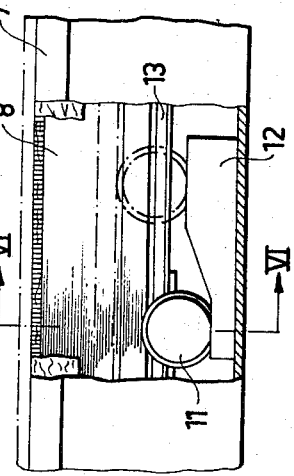

United States Patent Office 3,420,358
Patented Jan. 7, 1969

3,420,358
RECIPROCATING TYPE CONVEYOR
Per Gunnar Iversen, Drobak, Norway, assignor to Aktiebolaget Nordstroms Linbanor Corporation, Stockholm, Sweden, a Swedish corporation
Filed Feb. 14, 1967, Ser. No. 616,043
Claims priority, application Sweden, Feb. 15, 1966, 1,952/66
U.S. Cl. 198—219                 3 Claims
Int. Cl. B65g 25/04

ABSTRACT OF THE DISCLOSURE

A movable conveyor comprised of a plurality of releasably connected carriages, each supported by wheel assemblies and including a pair of transversely spaced, longitudinally extending frame members defining carrier surfaces, said conveyor further including a plurality of releasably connected shuttles each defining a goods carrying surface and being poistioned between the transfersely spaced frame members of said carriage, said shuttles being vertically and longitudinally displaceable in a reciprocal manner such that goods carried on the carrier surface of the spaced frame members can be elevated periodically by the shuttles and carried longitudinally of the conveyor in an elevated position, said shuttles then being lowered to return said goods to the carrier surface of said frame members and said shuttles being returned in such a lowered position longitudinally of the conveyor to its starting point and thence repeatedly in this manner to thereby move the goods from one end of the conveyor to the other.

---

The present invention relates to a conveyor of the type in which is provided a goods carrier, reciprocatingly movable in the direction along which the good sare being conveyed and adapted to be passed in said direction, together with its carrying surface, over the carrying surface of a stationary goods carrier, and to pass under the carrying surface of said stationary carrier in the opposite direction. The said conveyor hereinafter being designated an index conveyor.

When loading and unloading mixed cargoes on ships it is desired to keep the time taken to load and unload the ship down to a minimum and to reduce costs by cutting down on manpower. The most favorable method is the so-called truck-to-truck method where the goods are handled entirely by lift trucks, from the warehouse to the hold of the ship. Modern ships provided with hatch covers located in the side thereof enable such a method to be applied. In addition to this it is necessary to provide a transportable storage conveyor which is capable of extending into the hold, through the opening in the side of the ship, and serving as an intermediary link between the lift trucks in the warehouses and the lift trucks on board ship. The object of the present invention is to provide an index conveyor which fulfills these requirements. The object is achieved with the conveyor according to the invention, in that it has obtained the characteristics disclosed in the claims.

The invention will be more closely described with reference to the accompanying drawings, where FIG. 1 shows in perspective the loading (unloading) of a ship by means of an index conveyor according to the invention, consisting of three units, FIG. 2 shows in perspective and partly cut away the unit in the index conveyor provided with driving means, FIGS. 3 and 4 show, also partly cut away and in perspective, the coupling between the stationary goods carriers and the mobile goods carriers in two adjacent units in the index conveyor.

FIG. 5 is a side view partly cut away showing a portion of raising and lowering means for the conveyor, and FIG. 6 shows a section taken through the line VI—VI in FIG. 5.

The embodiment shown in the drawings of the index conveyor according to the invention consists of three transportable units: a driving unit 1, an intermediate unit 2 and an extension unit 3. These units are releasably connected together in line with each other. Each unit is capable of being moved on large wheels 4 mounted in the supporting frame of said unit and situated in the proximity of the centre of gravity of the same, and also on smaller pivotable and self-adjusting wheels 5, situated on the opposite side of the centre of gravity with respect to wheels 4. The units can be aligned in a common plane by means of ground supports 6 which can be raised and lowered.

FIG. 1 illustrates how rolls of paper A are conveyed from a warehouse B to the hold of a ship C, the extension unit 3 of the index conveyor projecting over the edge of the quay and in through one of the openings to the hold. Thus it is possible for lift trucks, previously driven onto the ship, to lift the rolls of paper which were placed on the conveyor by lift trucks stationed in the warehouse at the other end of said conveyor.

The index conveyor is fundamentally of the same type as that disclosed in Swedish Patent 205,254. Each unit included in the index conveyor comprises a supporting frame 7 which forms the stationary goods carrier and a shuttle 8 mounted in said carrier and forming the mobile goods carrier. The means for raising and lowering the units consist of mutually connected wheel units 9 which comprise two pairs of wheels, an inner pair 10 and an outer pair 11, mounted on a common shaft. All wheels are freely rotatable relative to each other. The shuttle 8 is mounted on the inner pair of wheels 10 and the outer pair of wheels 11 is mounted on cam means 12 secured in the frame, the wheel unit rolling on the cam surface of said cam means when the shuttle is raised or lowered whilst the inner pair of wheels 10 roll along the stationary shuttle. FIG. 5 shows the shuttle in lowered position for the return movement and its raised conveying position is indicated by means of dash dot lines. The wheel units are mutually connected by means of rods 13.

The separate means in each unit, said means being capable of moving relative to each other, are connected together with corresponding means in adjacent units. The frames are connected together by means of couplings 14, the shuttles by means of couplings 15 and the wheel units by means of couplings 16.

The driving means necessary for operating the conveyor are disposed in the driving unit 1. The reciprocatory movement of the shuttle is provided for by the hydraulic piston motor 17 and the reciprocatory movement of the wheel unit is effected by a hydraulic piston motor 18. The piston motors are fed from a hydraulic pump 19 which is driven by an electric motor 20. The working cycle is controlled by programming mechanism which may be started either by a switch adapted to be actuated by a roll of paper, or by means of an ultrasound system controlled by the driver of the lift truck. The working cycle comprises lifting of the shuttle so that its carrier surface rises above the surrounding stationary carrier surface, horizontal displacement of the shuttle through approximately 1.5 m. in the conveying direction, lowering of the shuttle below the surrounding carrier surface and horizontal displacement of the shuttle back to starting position.

I claim:
1. A conveyor comprising:
  (a) an index conveyor comprised of a plurality of releasably connected conveyor units each of said conveyor units including a carriage and wheel means operatively carried by said carriage for rolling support thereof, said carriage including transversely spaced, longitudinally extending frame members, each of said frame members defining a longitudinally extending carrier surface, the frame members of adjacent carriages being in substantially end to end relation to thereby provide a pair of substantially continuous carrier surfaces, and carriages further including means defining a support surface in a plane spaced below the plane of the carrier surfaces said support surface defining raised cam surfaces inclined and spaced longitudinally of said carriage support surface;

(b) a plurality of roller means positioned in each of said carriages in rolling engagement with said supporting surface each of said roller means including a shaft and a plurality of independently rotatable rollers on said shaft, one or more of said rollers of each of said roller means being positioned for rolling engagement reciprocally of a cam surface to provide a vertical elevation of said roller means;

(c) cooperative means connected to the roller means of adjacent carriages to releasably connect said roller means for coordinated movement of all of the roller means of said conveyor in a selective manner;

(d) a plurality of releasably connected shuttles at least one of said shuttles being positioned in each of said carriages between said frame members, said shuttles being supported in rolling engagement on one or more rollers of the roller means which are not movable reciprocally of the cam surfaces whereby said shuttles may be longitudinally displaced when said shuttles are in a raised position, said shuttles each defining a goods carrying surface positioned in a plane beneath the plane of the carrier surfaces of said carriages but movable to a plane above the plane of the carrier surfaces when said roller means is moved up said cam surfaces;

(e) a first driving means mounted on said index conveyor and operatively coupled to said roller means for reciprocal movement of the roller means forward and up the cam surface and rearward and down the cam surface;

(f) a second driving means mounted on said index conveyor and operatively connected to said shuttles for reciprocal movement of said shuttles longitudinally of said index conveyor;

(g) control means operatively coupled to said first and second driving means for periodic actuation of said first and second driving means in a desired sequence whereby said second driving means periodically operates after said first driving means has moved said roller means up said cam surfaces such that said shuttles are moved forwardly when said shuttles are located in an elevated position and rearwardly when in a lowered position.

2. A conveyor as recited in claim 1 wherein the wheel means on the carriages of the index conveyor includes a plurality of first wheel assemblies mounted to each of the carriages respectively at a position on one side of and in the proximity of the center of gravity of the carriage, said wheel means further including a plurality of second wheel assemblies, one of said second wheel assemblies being mounted respectively to each of said carriages on the opposite side of the center of gravity from said first wheel assemblies and wherein each of said carriages further includes a support member carried thereby, reciprocally movable vertically to and from a ground engaging position whereby each of said carriages may be stabilized on such ground engaging supports when desired.

3. A conveyor as recited in claim 1 wherein the wheel means of one of the endmost conveyor units is positioned in spaced relation from the outer end of the carriage to provide a substantial overhang whereby said carriage can be projected over the edge of a quay and into the hold of a ship or the like.

References Cited

UNITED STATES PATENTS

| 1,452,080 | 4/1923 | Jones | 198—233 |
| 2,346,659 | 4/1944 | Bruce | 198—92 |
| 3,221,870 | 12/1965 | Pagay | 198—219 |

FOREIGN PATENTS

| 205,254 | 1/1966 | Sweden. | |

RICHARD E. AEGERTER, *Primary Examiner.*